UNITED STATES PATENT OFFICE.

JOSEPH FLACHSLAENDER AND KARL PAUL GRÄLERT, OF ELBERFELD, AND MAX BUFF, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

GREEN SULFUR DYE.

1,093,259.     Specification of Letters Patent.     Patented Apr. 14, 1914.

No Drawing.     Application filed August 19, 1912. Serial No. 715,946.

*To all whom it may concern:*

Be it known that we, JOSEPH FLACHSLAENDER, KARL PAUL GRÄLERT, and MAX BUFF, doctors of philosophy, chemists, citizens of the German Empire, residing at, respectively, Elberfeld, Elberfeld, and Vohwinkel, near Elberfeld, Kingdom of Prussia, Germany, have invented new and useful Improvements in Green Sulfur Dye, of which the following is a specification.

Our invention relates to the manufacture and production of new green copper containing sulfur colors which are obtained by treating with alkali polysulfids and copper or copper compounds the leucoindophenols of the formula:

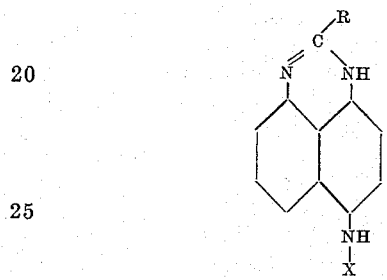

(in which R means a substituent such as —H, —CH$_3$, —C$_2$H$_5$, —C$_6$H$_5$, etc., and X a phenolic radical) or the corresponding indophenols produced by joint oxidation of perimidin compounds (such as perimidin or substituted perimidins) and a para-aminophenol (or its substitution products, such as para-amino-cresol, para-amino-chloro-phenols).

The new dyes contain copper and are after being dried and pulverized dark powders soluble in a solution of sodium sulfid generally with a green coloration and scarcely soluble in concentrated sulfuric acid with a bluish coloration. They are distinguished by their fastness to boiling and to light.

In order to illustrate the new process more fully the following example is given, the parts being by weight:—35.8 parts of the leuco-indophenol having the following formula:

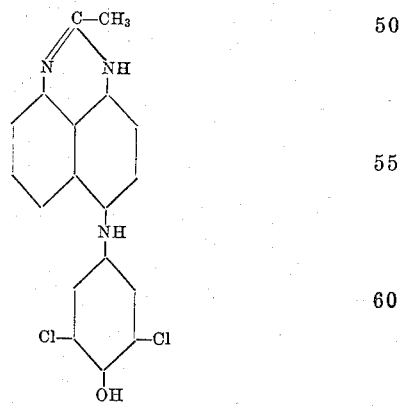

obtained from monomethyl-perimidin and 2.6-dichloro-4-amino-1-phenol are added to a solution of 40 parts of sulfur and 55 parts of sodium sulfid (60–62 per cent.) and after the addition of 10 parts of CuSO$_4$+5aq and 150 parts of alcohol, the mixture is heated to boiling in a vessel provided with a reflux condenser. The melt can be directly dried or subjected to purification. The dyestuff pecipitated by a current of air contains copper and is after being dried and pulverized a dark powder soluble in a sodium sulfid solution with a yellowish-green coloration. It is scarcely soluble in concentrated sulfuric acid with a bluish-green coloration and is soluble in hot caustic soda lye (30° Bé.) with a dark green coloration. It dyes cotton in pure yellowish-green shades fast to light and to washing.

The above mentioned quantities of sodium sulfid and of sulfur as well as the temperature and the duration of the reaction can be varied within wide limits. Similar copper-containing dyestuffs are obtained by using other of the above mentioned leuco compounds. The leuco compounds can be replaced by the corresponding indophenols which when treated with alkali sulfid yield the leuco products.

We claim:—

1. The herein-before described new copper-containing sulfur dyes, being sulfur-containing derivatives of leucoindophenols of the formula:

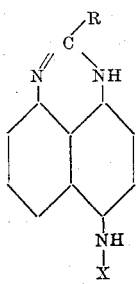

in which R means a substituent and X a phenolic radical, which contain copper and are after being dried and pulverized dark powders being soluble in a solution of sodium sulfid generally with a green coloration; being scarcely soluble in concentrated sulfuric acid generally with a bluish coloration; and dyeing unmordanted cotton green shades fast to light and to washing, substantially as described.

2. The hereinbefore described new copper-containing sulfur dye, being a sulfur-containing derivative of the leucoindophenol of the formula:

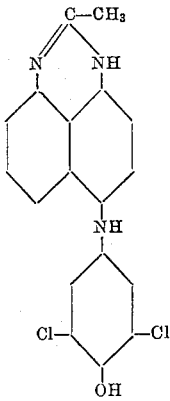

which contains copper and is after being dried and pulverized a dark powder soluble in a sodium sulfid solution with a yellowish-green coloration and soluble in concentrated sulfuric acid with a bluish-green coloration and in hot caustic soda lye (30° Bé.) with a dark green coloration; dyeing unmordanted cotton in pure yellowish green shades fast to light and to washing, substantially as described.

3. The herein-before described new copper-containing sulfur dyes being sulfur containing derivatives of indophenols obtainable from a perimidin compound having the following general structure:

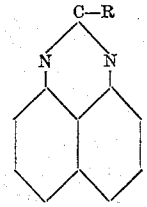

in which R means a substituent, and from a para-aminophenol, these new dyes contain copper and being when dried and pulverized dark powders soluble in an alkali-sulfid solution generally with a green coloration, and dyeing cotton green shades, substantially as described.

4. The herein-before described new copper-containing sulfur dyes being sulfur containing derivatives of the indophenols obtainable from a perimidin compound of the general formula:

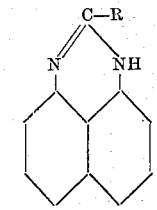

in which R means an organic radical, and from a para-aminophenol, which dyes contain copper and are when dried and pulverized dark powders being soluble in an alkali-sulfid solution generally with a green coloration, and dyeing cotton green shades, substantially as described.

5. The herein-before described new copper-containing sulfur dye being a sulfur containing derivative of the indophenol obtainable from methyl-perimidin having the formula:

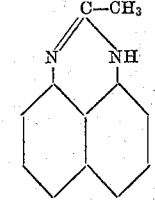

and from 2.6-dichloro-4-amino-1-phenol, which new dye contains copper and is when dried and pulverized a black powder, soluble in a sodium-sulfid solution with a green coloration, and dyeing cotton green shades, substantially as described.

In testimony whereof we have hereunto set our hands in the presence of two subscribing witnesses.

JOSEPH FLACHSLAENDER. [L. s.]
KARL PAUL GRÄLERT. [L. s.]
MAX BUFF. [L. s.]

Witnesses:
HELEN NUFER,
ALBERT NUFER.